3,325,476
REACTION OF AMINE WITH EPOXIDES ACCOMPANIED BY SIMULTANEOUS DEHYDROHALOGENATION
Rostyslaw Dowbenko, Gibsonia, Pa., assignor to Pittsburgh Plate Glass Company, Pittsburgh, Pa., a corporation of Pennsylvania
No Drawing. Filed Jan. 7, 1966, Ser. No. 519,295
The portion of the term of the patent subsequent to Apr. 5, 1983, has been disclaimed
8 Claims. (Cl. 260—239)

This application is a continuation-in-part of copending application Ser. No. 302,698, filed Aug. 16, 1963, now abandoned.

This invention relates to the reaction of halogen-containing epoxides with amines and to the nitrogen-containing products of that reaction.

The epoxides which constitute the starting material for the process of this invention correspond substantially to the formula:

(I) 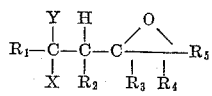

where Y is selected from the group consisting of bromine, chlorine and fluorine, X is selected from the group consisting of chlorine and bromine, $R_1$ is selected from the group consisting of bromine, chlorine and fluorine and lower alkyl radicals, and $R_2$, $R_3$, $R_4$ and $R_5$ are selected from the group consisting of hydrogen and alkyl radicals containing 1 to 10 carbon atoms, such as methyl, ethyl, butyl, hexyl and octyl. A method for preparing the compounds of Formula I is disclosed in application Ser. No. 228,239, filed Oct. 4, 1962 (now abondoned).

Of the above compounds, the preferred starting materials are 4-halo or alkyl, 4,4-dihalo-1,2-epoxybutanes and most preferably, 4,4,4-trichloro-1,2-epoxybutane. Additional compounds include:

4,4,4-tribromo-2-methyl-1,2-epoxybutane
4,4,4-trichloro-1,2-epoxypentane
5-methyl-5,5-dichloro-2-methyl-2,3-epoxybutane
5,5,5-trichloro-2,3-epoxyhexane
5,5,5-trichloro-3-methyl-2,3-epoxypentane
5,5,5-trichloro-2,3-dimethyl-2,3-epoxypentane
5,5,5-trichloro-4-methyl-2,3-epoxyhexane
5,5,5-trichloro-3,4-dimethyl-2,3-epoxyhexane
5,5,5-trichloro-2,3,4-trimethyl-2,3-epoxyhexane
6,6,6-trichloro-3-methyl-3,4-epoxyhexane
5,5,5-trichloro-3-isopropyl-2,3-epoxypentane
1,1,1-trichloro-3-butyl-2-methyl-3,4-epoxyoctane
5,5,5-trichloro-4-octadecyl-2,3-epoxyhexane
5,5,5-trichloro-3-hexyl-2,3-epoxypentene It has now been found that the above epoxy compounds react with primary or secondary amines eliminating HX to produce compounds corresponding to the formula:

(II) 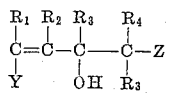

where Y and $R_1$, $R_2$, $R_3$, $R_4$ and $R_5$ are as defined above and where Z is a radical derived by removing a hydrogen atom from the amine nitrogen atom of an amine, said amine nitrogen atom having from 1 to 2 carbon-to-nitrogen bonds and from 1 to 2 nitrogen-to-hydrogen bonds. Preferably, the amine is a secondary amine containing 2 carbon-to-nitrogen bonds and 1 hydrogen-to-nitrogen bond. More preferably, the amine is selected from the group consisting of morpholine, piperidine, pyrrolidine, N-methyl-piperazine, hexamethyleneimine, diethylamine, di-n-propylamine, diisopropylamine, di-n-butylamine, N-methylethanolamine, diethanolamine, and ethanolamine.

The amines which react with the epoxides of Formula I to produce the compounds of this invention are any lower primary or secondary amines. In other words, the amine group contains at least one C—N bond and at least one N—H bond. Preferably, the amines are secondary amines, i.e., amines having an amine group containing two C—N bonds and one N—H bond. Preferably, the amines utilized in preparing the compounds of this invention contain a total of 20 carbon atoms or less, and more preferably, 10 carbon atoms or less. Examples of primary amines which may be uitlized to prepare the compounds of this invention are alkylamines, such as ethylamine, butylamine and hexylamine, octylamine, decylamine, hexadecylamine and octadecylamine; alkenylamines, such as allylamine, 2-hexenylamine, 4-decenylamine and octodecenyl amines; alkanolamines, such as ethanolamine, octanolamine, dodecanolamine; haloalkylamines, such as beta-chloroethylamine; and arylamines, such as aniline. Examples of secondary amines which may be used to prepare the compounds of this invention include dialkylamines, such as diethylamine, di-n-propylamine, diisobutylamine, dihexylamine and dioctylamines; dialkenylamines, such as diallylamine and dihexenylamines; dialkanolamines, such as diethanoamine and didecanolamine; dihaloalkylamines, such as bis(beta-chloroethyl) amine and N,N'-dialkylalkylenediamines, such as N,N'-dimethylethylenediamine. The secondary amines do not necessarily have to contain two identical substituents. Examples of such mixed amines include N-methylethanolamine, N-methylallylamine and N-methylaniline. Additional secondary amines include those amines in which the amine nitrogen is contained within a heterocyclic ring. Preferably, the heterocyclic amines are six-membered ring heterocyclic amines. Examples of such amines include morpholine, piperidine, pyrrolidine, N-methylpiperazine, hexamethyleneimine, and thiomorpholine. As it may be seen from the above, the heterocyclic amine may contain additional hetero atoms, for example, nitrogen, oxygen or sulfur.

The reaction conditions employed in the method herein disclosed to produce the products of this invention vary widely. For example, the reaction may be carried out at ordinary room temperature (about 25° C.), although somewhat elevated temperatures may be used to induce faster reaction rates. Preferably, the reaction is carried out at a temperature between about 50° C. and about 150° C. or higher, depending upon the reactivity and stability of the particular reactants and products involved in the reaction.

The proportion of reactants is at least critical to a degree. In the reaction of the epoxy compound and amine, at least about 2 moles of amine per mole of epoxide should be employed, and preferably at least about 2½ moles of the primary or secondary amine, since 1 mole of hydrogen halide is produced in the reaction. However, if desired, up to 1 mole of the amine may be replaced by a hydrogen halide acceptor, such as a tertiary amine.

The reaction of the epoxide and the amine is usually conducted in the absence of a solvent or diluent. However, if desired, the reaction may be carried out in the presence of an inert solvent or diluent, such as benzene, toluene, ketones or ethers.

The compounds of this invention may be recovered from the reaction mixture by conventional techniques known to the organic chemist. Usually the reaction yields a mixture of the desired product and an amine hydrohalide. Usually the amine hydrohalide is relatively insoluble in the reaction mixture and can be removed by filtration. Another method of separating the amine hydrohalide from the desired product is to dissolve the reaction mixture in a suitable solvent and extract the amine hydrohalide with water. Still another method is to neutralize the amine hydrohalide with a base, such as potassium carbonate, and separate the resulting free amine from the desired product, on the basis of their differing physical properties, by means of extraction, crystallization or distillation. In some instances, the products crystallize out of solution and may be purified by recrystallization with appropriate solvents. When a solvent is used in which the desired product is soluble, removal of the solvent by evaporation or vacuum distillation may render the product crystalline. This product may then be recrystallized if desired. Where the reaction mixture is liquid or a low-melting solid, the products may be isolated by vacuum distillation, or by combined distillation and recrystallization. Other techniques such as solvent extraction and chromatography may also be employed to isolate the products of this invention.

There are set forth below several examples which illustrate the method of producing the compounds of this invention and the manner in which such compounds were isolated and identified. These examples are, of course, given by way of illustration only and should not be construed as limiting the invention to the particular details thereof. All parts and percentages set forth, as is true throughout this specification, are by weight unless otherwise specified.

EXAMPLE I

*1-(N-morpholinyl)-4,4-dichloro-3-buten-2-ol*

To 43.5 grams (0.50 mole) of morpholine there was added 17.55 grams (0.10 mole) of 4,4,4-trichloro-1,2-epoxybutane, dropwise with stirring over a period of 20 minutes. The resulting mixture was stirred at room temperature for 5 hours. The temperature was then raised to 100° C. and the mixture stirred at this temperature for 3 hours. A solid was present in the reaction mixture. After cooling, a small amount of benzene was added to the mixture and the mixture filtered. The solid was washed with a small amount of benzene and dried, yielding 6.7 grams of morpholine hydrochloride, melting point 172° C.–175° C. The filtrate was freed from benzene under vacuum and the residue distilled to obtain 19.5 grams of a liquid, 1 - (N - morpholinyl)-4,4-dichloro-3-buten-2-ol, boiling point 90° C.–93° C. at 0.05 millimeters of mercury. The infrared spectrum of the distillate showed a band at 2.92 microns and a medium doublet at 6.03 and 6.16 microns. The analytical sample was obtained by one redistillation, boiling point 90° C.–93° C. at 0.05 millimeters of mercury.

*Analysis.*—Calculated for $C_8H_{13}Cl_2NO_2$: C, 42.49%; H, 5.79%; Cl, 31.36%; N, 6.20%. Found: C, 40.11%; H, 5.47%; Cl, 32.97%; N, 5.84%.

EXAMPLE II

*1-(N-piperidyl)-4,4-dichloro-3-buten-2-ol*

To 89.5 grams (1.05 moles) of piperidine there was added 52.6 grams (0.30 mole) of 4,4,4-trichloro-1,2-epoxybutane, dropwise with stirring. The reaction mixture was then heated. An exothermic reaction was noted at 80° C. The temperature was held below 100° C. with cooling and then the reaction mixture was heated at 100° C. for 5 hours and then cooled. A solid was present in the reaction mixture. A small amount of benzene was added and the reaction mixture was filtered. The solid was washed with a small amount of benzene and dried to yield 38.9 grams of piperidine hydrochloride, melting point 240° C.–241° C. The filtrate was freed of benzene under vacuum and distilled to yield 61.1 grams of a liquid boiling point 95° C.–108° C. at 0.2 millimeter of mercury. The distillate was redistilled to yield 56.8 grams of 1 - (N-piperidyl)-4,4 - dichloro-3-buten-2-ol, boiling point 79° C.–80° C. at 0.2 millimeter of mercury. The infrared spectrum showed a medium band at 2.95 microns, a strong band at 6.16 microns and a weak band at 6.04 microns.

*Analysis.*—Calculated for $C_7H_{13}Cl_2NO_2$: C, 39.27%; H, 6.12%; Cl, 33.12%; N, 6.54%. Found: C, 39.35%, 39.4%; H, 6.23%, 6.08%; Cl, 33.10%, 33.24%; N, 6.53%, 6.45%.

Additional compounds which may be produced by similar reactions include:

1[N-(N'-methylpiperazinyl)]-4,4-dichloro-3-buten-2-ol;
1[N-methyl-N-(2-hydroxyethyl)amino]-4,4-dichloro-3-buten-2-ol;
1-(N,N-dibutylamino)-4,4-dichloro-3-buten-2-ol;
1-[N-(2-aminoethyl)]-4,4-dichloro-3-buten-2-ol; and
1-[N-(2-hydroxyethyl)amino]-4,4-dichloro-3-buten-2-ol.

In the reactions of Examples I and II, as well as in similar reactions, none of the 1-amino-2-ol isomer was recovered.

The compounds of this invention contain an amine group, and accordingly find utility as neutralizing agents for acids such as hydrochloric acid. These compounds are also useful as chemical intermediates since they contain a reactive amine group, hydroxyl group and dichloromethylene group rendering the products of this invention versatile building blocks for more complex molecules. For example, the hydroxyl group may be esterified or etherified. Thus, the compounds of this invention may be reacted with acrylyl chloride or methacrylyl chloride, for example, to produce unsaturated monomers which may be homopolymerized or copolymerized with other unsaturated monomers such as ethyl acrylate, methyl methacrylate or styrene to produce polymers which are useful as decorative and protective coatings for wood and metal. Further, the compounds of this invention may be used as pesticides, for example, insecticides, fungicides, or nematocides. The compound of this invention may also be utilized as catalysts for the isocyanate-alcohol reaction to produce polyurethane coatings, castings, or foams.

Although specific examples of the invention have been set forth, it is not intended to limit the invention solely thereto, but to include all of the variations and modifications falling within the scope of the appended claims.

I claim:

1. A method of preparing a compound of the formula:

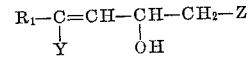

where Y is selected from the group consisting of chlorine, bromine and fluorine, $R_1$ is selected from the group consisting of chlorine, bromine, fluorine and lower alkyl radicals and Z is a radical derived by removing a hydrogen atom from an amine nitrogen atom of an amine selected from the group consisting of lower alkyl, alkenyl, hydroxyalkyl, haloalkyl and aryl primary and secondary amines containing one to 20 carbon atoms and heterocyclic amines selected from the group consisting of morpholine, piperidine, pyrrolidine, N-methyl piperazine and hexamethyleneimine, which comprises reacting an epoxide corresponding to the formula:

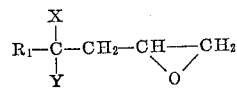

where Y is selected from the group consisting of bromine, chlorine and fluorine; X is selected from the group consisting of bromine and chlorine, $R_1$ is selected from the group consisting of bromine, chlorine, fluorine and lower alkyl radicals, with at least 2 moles per mole of the epoxide of an amine selected from the group consisting of lower alkyl, alkenyl, hydroxyalkyl, haloalkyl and aryl primary and secondary amines containing one to 20 carbon atoms and heterocyclic amines selected from the group consisting of morpholine, piperidine, pyrrolidine, N-methyl piperazine and hexamethyleneimine, at a temperature of from about 25° C. to about 150° C.

2. A method as in claim 1 wherein the amine is a secondary amine.

3. A method as in claim 1 wherein the amine is selected from the group consisting of morpholine, piperidine, pyrrolidine, N-methyl piperazine and hexamethyleneimine.

4. A method as in claim 1 wherein the amine is a primary amine.

5. A method as in claim 1 wherein $R_1$, X and Y are chlorine.

6. A method as in claim 5 wherein the amine is a secondary amine.

7. A method as in claim 5 wherein the amine is selected from the group consisting of morpholine, piperidine, pyrrolidine, N-methyl piperazine and hexamethyleneimine.

8. A method as in claim 5 wherein the amine is a primary amine.

References Cited

UNITED STATES PATENTS

| | | | |
|---|---|---|---|
| 2,666,783 | 1/1954 | Lytton | 260—294.7 |
| 2,700,686 | 1/1955 | Dickey et al. | 260—633 |
| 3,177,254 | 4/1965 | Rogier et al. | 260—294.7 |
| 3,244,707 | 4/1966 | Dowbenko | 260—294.7 |

FOREIGN PATENTS

| | | |
|---|---|---|
| 133,738 | 8/1949 | Australia. |
| 527,462 | 7/1956 | Canada. |

OTHER REFERENCES

Fieser et al. Adv. Org. Chem., page 143, Reinhold Pub. Corp. N.Y. (1961).

Pudovik et al., Chem. Abst., vol. 53, col. 3034 and 3035 (1959).

WALTER A. MODANCE, *Primary Examiner.*

A. D. SPEVACK, *Assistant Examiner.*